United States Patent
Hatamura

(10) Patent No.: US 6,339,641 B1
(45) Date of Patent: Jan. 15, 2002

(54) TELEPHONE DEVICE

(75) Inventor: Junji Hatamura, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 08/998,729

(22) Filed: Dec. 29, 1997

(30) Foreign Application Priority Data

Jan. 7, 1997 (JP) .............................................. 9-000753

(51) Int. Cl.[7] .................................................. H04M 9/00

(52) U.S. Cl. ........................... 379/388.07; 379/388.01; 379/421

(58) Field of Search ................................. 379/387–393, 379/420, 421, 100.01, 100.06, 387.01, 388.01–388.07

(56) References Cited

U.S. PATENT DOCUMENTS 4,756,021 A * 7/1988 Nakayama .................. 379/388
4,794,640 A * 12/1988 Yeh .............................. 379/388
5,040,206 A * 8/1991 Tokumasu et al. .......... 379/420

FOREIGN PATENT DOCUMENTS

GB 2301730 * 12/1996 .................. 379/421

* cited by examiner

Primary Examiner—Wing F. Chan
(74) Attorney, Agent, or Firm—Oliff, & Berridge, PLC

(57) ABSTRACT

In a facsimile machine 1, when the speakerphone key 14 is depressed (S1: YES) and a call signal from some other telephone is not arriving to the facsimile machine 1(S2: NO), a speaker 26 is made ON and the microphone M is made OFF (S3). When at least one key of a dial key group 11 is depressed (S4: YES) and the telephone line 25 is connected to a telephone of the other end (S5: YES), the microphone M is made ON while the speaker 26 is maintained as being ON (S6).

16 Claims, 4 Drawing Sheets

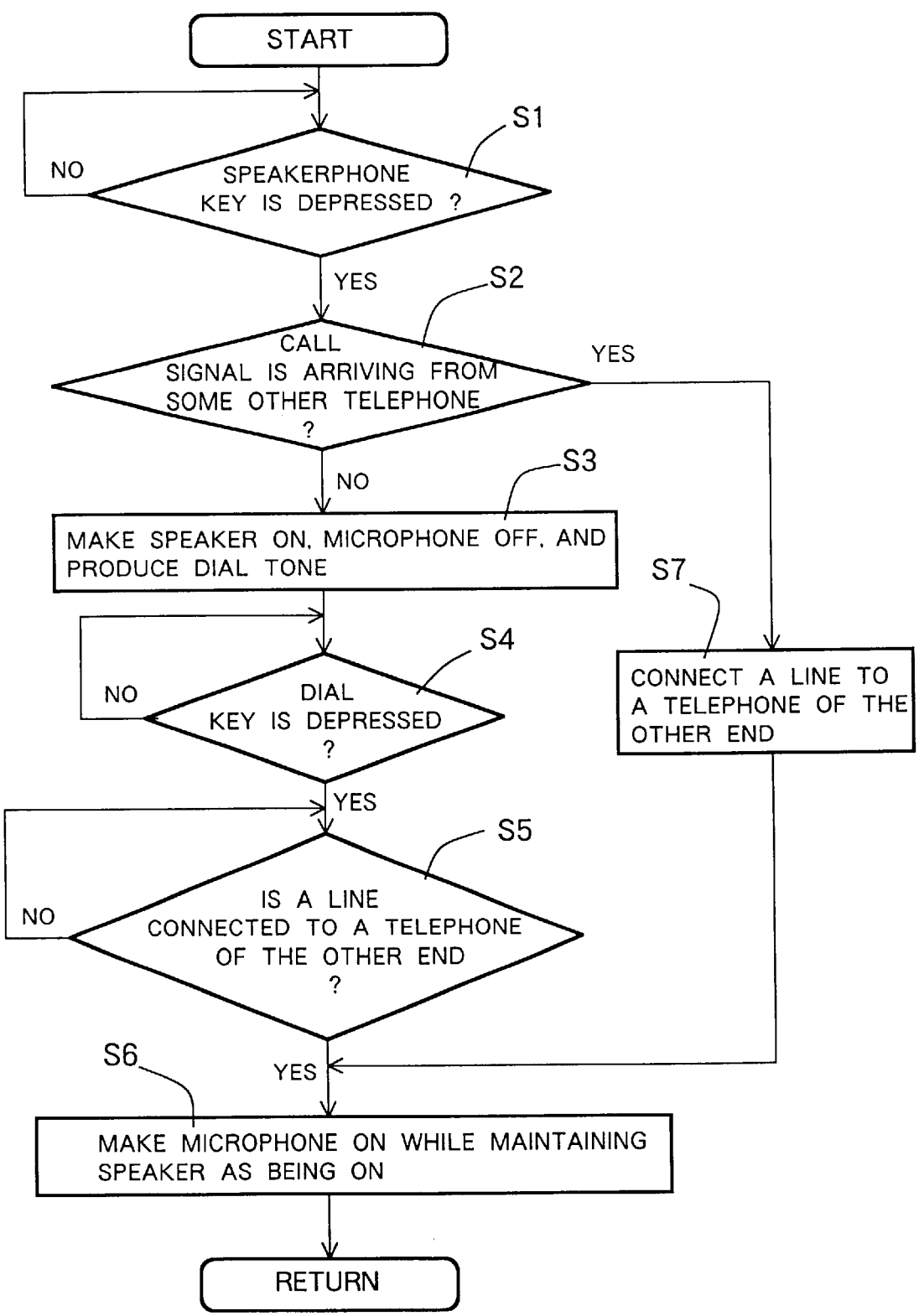

TELEPHONE DEVICE

BACKGROUND OF THE INVENTION

1. Field of the Invention

The present invention relates to a telephone device provided with a microphone and a speaker built in a body unit of the telephone device, having a speakerphone function whereby a call through a receiver of the telephone device is switched to a call through the microphone and the speaker, and more particularly to a telephone device capable of preventing the occurrence of howling caused when a dial tone produced in switching to a speakerphone function mode is received by the microphone and comes out from the speaker.

2. Description of Related Art

Conventionally, there is known a telephone device, provided with a microphone and a speaker which are built in a body unit of the device, has a speakerphone function to switch a call through a receiver to a call through the microphone and the speaker. In such the telephone device, the speakerphone function can be used by operation of a speakerphone switching key provided on a control panel of the body unit, whereby a user can make a call without lifting the receiver, namely, in a hand-free state.

In the above conventional telephone device, however, upon depression of the speakerphone switching key, a dial tone is given through the speaker and the microphone is put in an ON state. Accordingly, the dial tone is received by the microphone, and the received dial tone comes out from the speaker. At this time, it is possible to generate howling, causing a problem of change in the sound given through the speaker, thus disturbing a call.

SUMMARY OF THE INVENTION

The present invention has been made in view of the above circumstances and has an object to overcome the above problems and to provide a telephone device capable of preventing the occurrence of howling caused by that a dial tone produced when a speakerphone function mode is selected is received by a microphone and is sounded from a speaker, and capable of satisfactorily making a call without any disturbance of the call in the speakerphone function mode.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a telephone device of this invention comprises a microphone and a speaker provided in a body unit, a mode selection key for selecting a speakerphone mode enabling a call through the microphone and speaker, a control panel in which a plurality of dial keys are arranged, first judgement means for judging whether the mode selection key has been operated, first control means for making the speaker ON and the microphone OFF when the first judgement means detects that the mode selection key has been operated, and second control means for maintaining the speaker in the ON state and making the microphone ON upon operation of the dial key.

According to the telephone device of the invention, when the first judgement means detects that the switching key is depressed, the first control means causes the speaker to be ON and the microphone to be OFF. Upon depression of the dial key, the second control means causes both the speaker and the microphone to be ON. Accordingly, since the microphone is made OFF when the speakerphone function mode is selected by the depression of the switching key, any dial tone is not received by the microphone, which makes it possible to surely prevent the occurrence of howling. Furthermore, both the speaker and the microphone are made ON by the second control means when a dial key is depressed, so that a normal call can be made using a speakerphone function.

According to another aspect of the present invention, there is provided a telephone device comprising a microphone and a speaker provided in a body unit, a mode selection key for selecting a speakerphone mode enabling a call through the microphone and the speaker, a control panel in which a plurality of dial keys are arranged, first judgement means for judging whether the mode selection key has been operated, first control means for making the speaker ON and the microphone OFF when the first judgement means detects that the mode selection key has been operated, second judgement means for judging whether or not a call signal from some other telephone is arriving to the telephone device after the first judgement means detects that the mode selection key has been operated, connecting means for connecting a line of the telephone device with some other telephone when the second judgement means judges that there is a call from some other telephone, and second control means for making the speaker and the microphone ON after the line-connection by the connecting means.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 4 is a flow chart of a speakerphone mode control program.

DETAILED DESCRIPTION OF THE PREFERRED EMBODIMENTS

Figure 1:
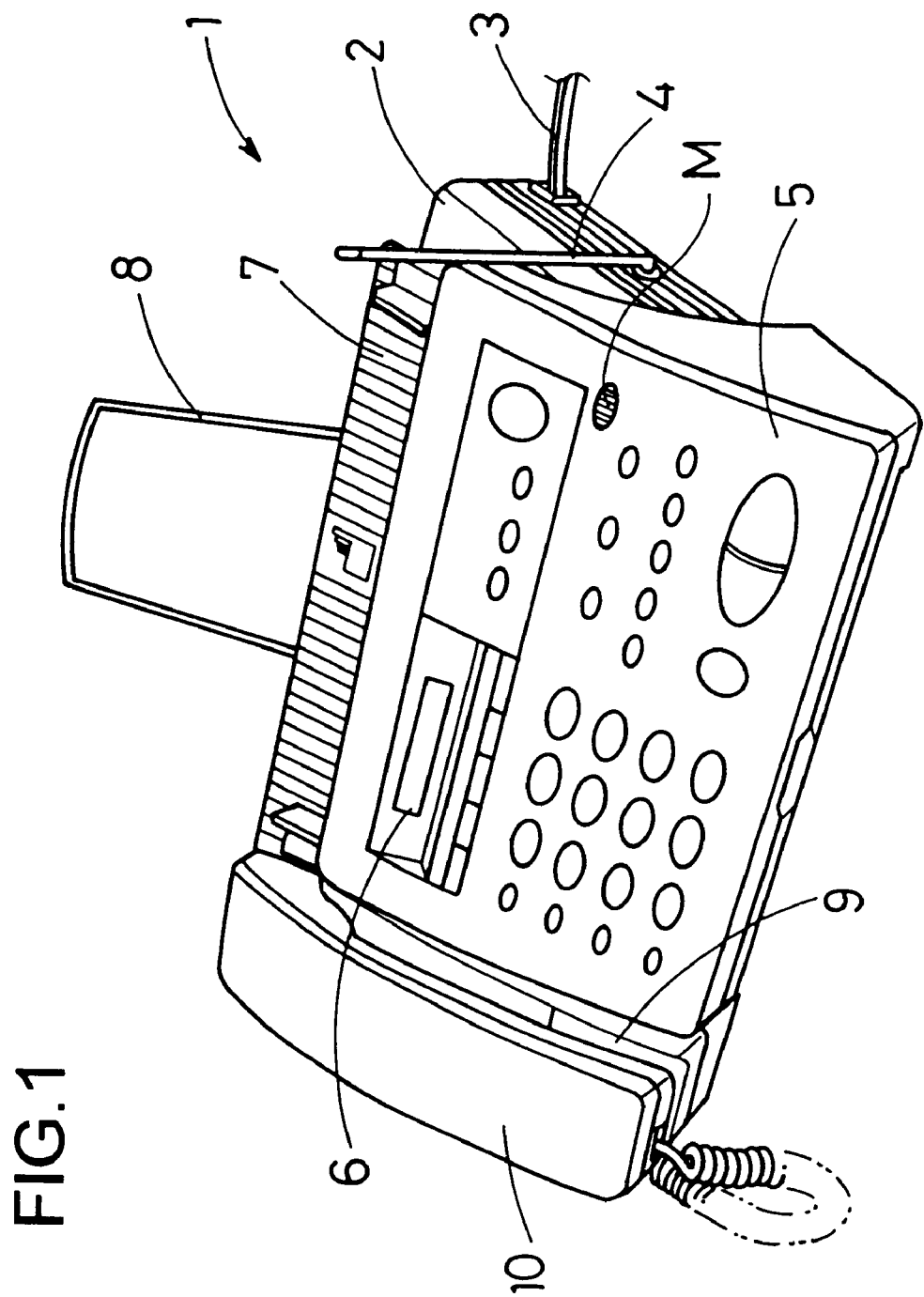
FIG. 1 is a perspective view of the whole facsimile device in an embodiment of the present invention.

A detailed description of one preferred embodiment of a facsimile machine embodying a telephone device according to the present invention will now be given referring to the accompanying drawings. A schematic construction of the facsimile machine in the embodiment will first be described with respect to FIG. 1. FIG. 1 is a perspective view of the facsimile machine.

In FIG. 1, the facsimile machine 1 has a body unit 2, a power cord 3, and an antenna 4 to make a call with sub-telephone devices (not shown) of a party line, the power cord 3 and the antenna 4 being arranged at a right side wall of the body unit 2. On an upper face of the body unit 2 is provided a control panel unit 5 in which a liquid crystal display 6 and a microphone M are disposed. This microphone M is to receive the voice of a user speaking over the phone in a speakerphone mode that a call can be made with the microphone M and a speaker 26 (see FIG. 3) without necessity for the user to lift a handset 10. On the control panel unit 5, disposed are various keys which will be described later.

The facsimile machine 1 is further provided with a stacker 7 for holding sheets (documents) in a stacked state, behind the control panel unit 5, and a sheet support 8 at the back of the stacker 7. A handset holding portion 9 is formed at a left side of the body unit 2, on which the handset 10 is put.

Figure 2:
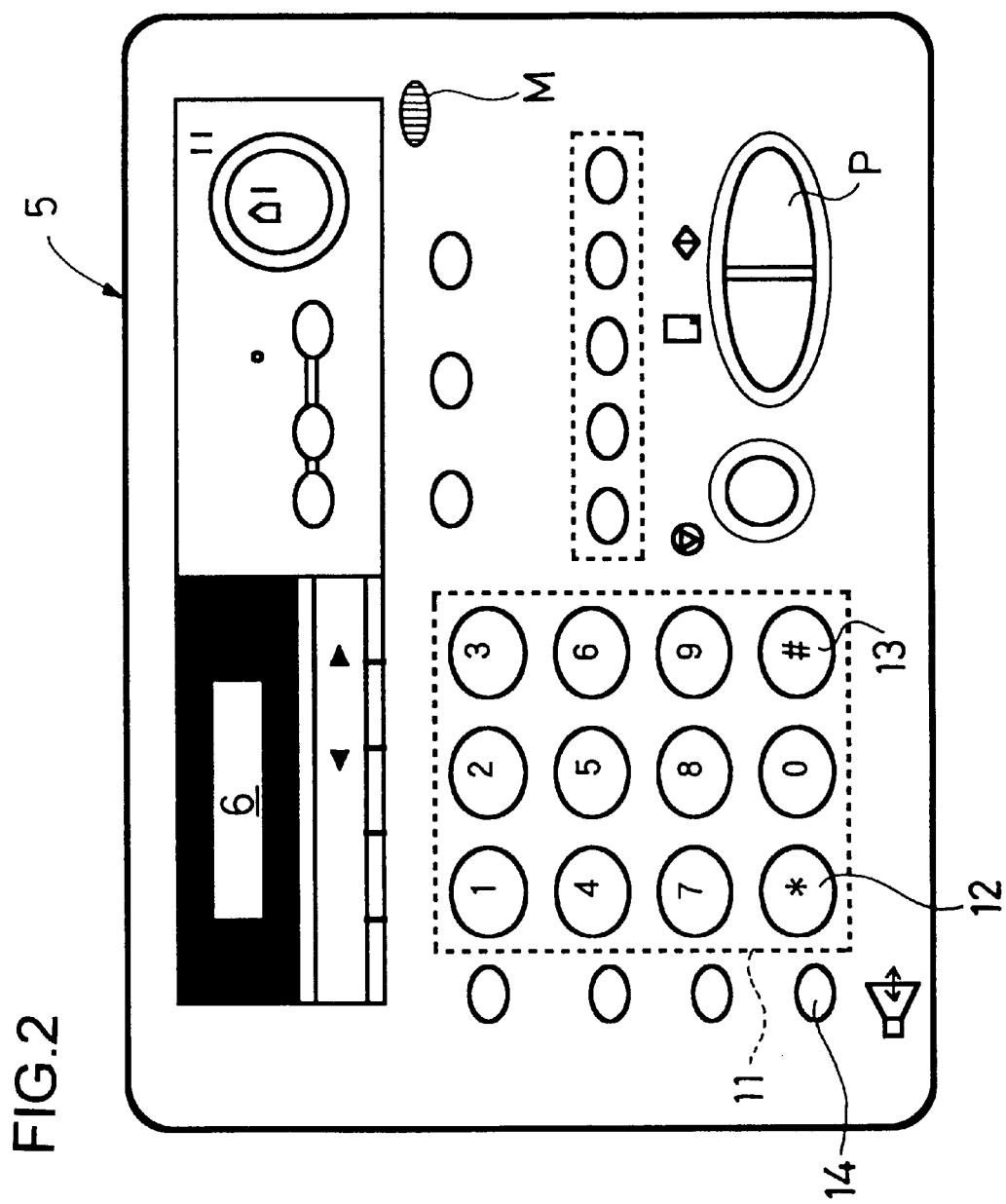
FIG. 2 is a plane view of the control panel unit of the facsimile device of FIG. 1.

Next, each function of the keys arranged on the control panel unit 5 will be described referring to FIG. 2. FIG. 2 is a plane view of the control panel unit 5.

In FIG. 2, at the left side on the control panel unit 5, arranged are a dial key group 11 to input numbers, having numeral keys "1" to "9", an asterisk key 12, and a sharp key 13. A speakerphone key 14, arranged at a lower left side of the dial key group 11, is to select a speakerphone mode whereby a call through the handset 10 is switched to that through the microphone M and the speaker 26. On the control panel unit 5, further arranged are various keys needed for the operation of the facsimile machine 1, for example, a start key P to start a facsimile transmission.

Figure 3:
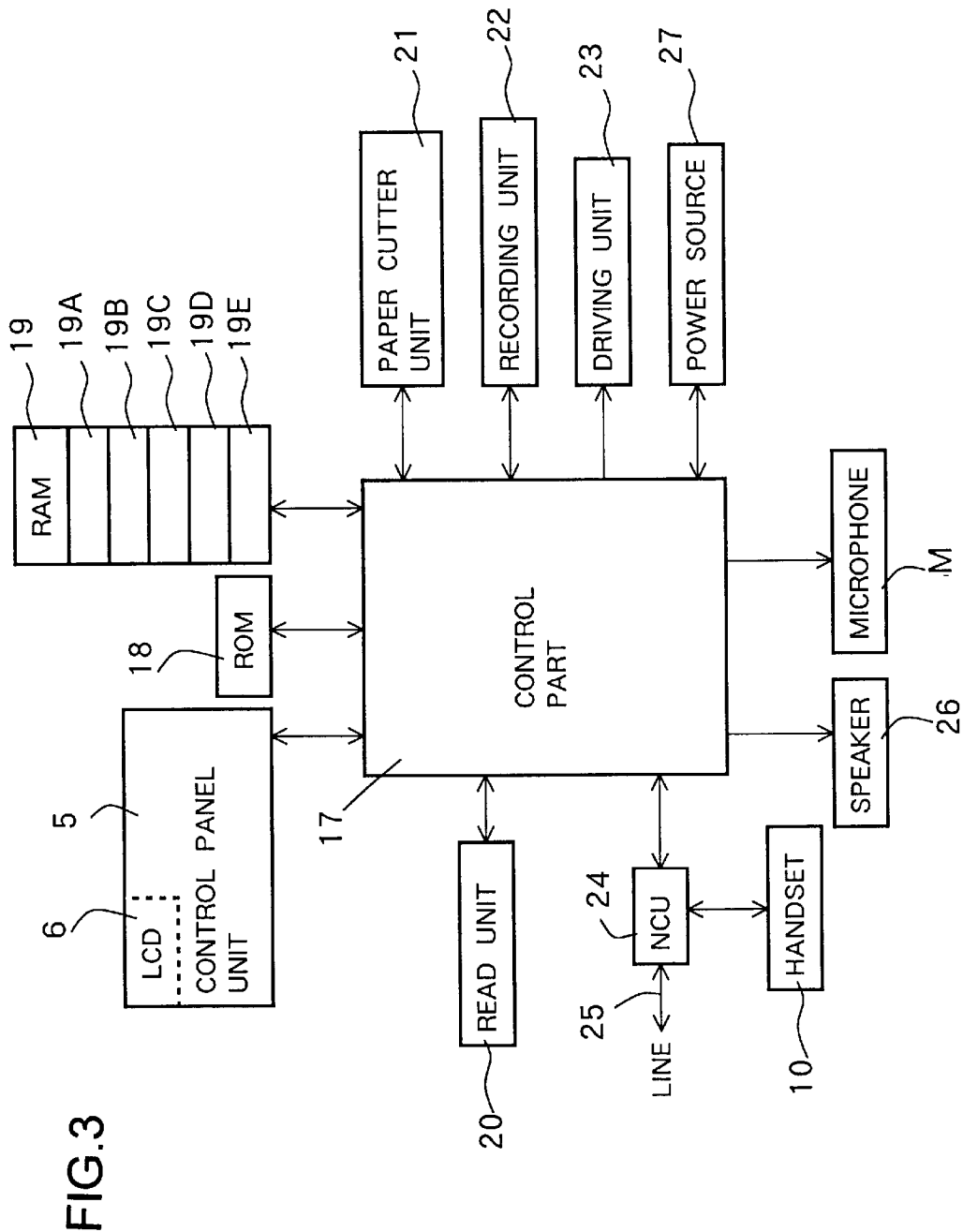
FIG. 3 is a block diagram showing a control system of the facsimile device.

A control system of the facsimile machine 1 will be explained hereinafter with reference to FIG. 3. FIG. 3 is a block diagram showing the control system.

In FIG. 3, the control system of the facsimile machine 1 comprises a control part 17 including a CPU as a center. A ROM 18 and a RAM 19 are connected to the control part 17. The ROM 18 stores a speakerphone mode control program which will be mentioned later and other various programs required for executing other facsimile functions. The ROM 19 stores temporarily various data calculated through the CPU and includes a plurality of memory areas 19A to 19E to store voice data and image data received through a telephone line. To the control part 17, also connected are the control panel unit 5 including the liquid crystal display 6, a read unit 20 including a read scanner to read characters and figures and the like of a document fed into the body unit 2 from the stacker 7, and a cutter unit 21 for cutting recording paper by driving a cutter through a cutter driving motor, a recording unit 22 including a print head to print an image on the recording paper in accordance with the image data received through a telephone line, and a driving unit 23 including a print head driving mechanism and a paper feeding mechanism to control the feeding of recording paper and the like.

Furthermore, a telephone line 25 and the handset 10 are connected to the control part 17 through a network control unit. (NCU) 24. The speaker 26, the microphone M, and a power source 27 are also connected to the control part 17. It is noted that the speaker 26 is to sound the voice of a user in calling in the speakerphone mode and to convert voice data stored in the memory area 19A and others of the RAM 19 to vocal sound.

When making a facsimile transmission by the facsimile machine 1 constructed as above, a user sets a document to be transmitted in the stacker 7, inputs the number of a facsimile machine to which the data of the document is to be transmitted by depressing the dial key 11, and then depressed the start key P arranged on the control panel unit 5. Thus image data of the document is scanned by the read unit 20 and transmitted through the NCU 24 and the telephone line 25 to the facsimile of the other end of the line. When image data is transmitted to the facsimile machine 1, on the other hand, the control part 17 receives the image data through the telephone line 25 and the NCU 24 and controls to drive the print head of the recording unit 22 and the driving unit 23 to print an image on recording paper in accordance with the image data. Upon completion of printing, the control part 17 causes the cutter unit 21 to cut the printed recording paper. When voice data is transmitted to the facsimile machine 1, the control part 17 makes a communication with the handset 10 through the telephone line 25 and the NCU 24.

Next, explanation is made on the control operation to be executed in the speakerphone mode to make a call by the facsimile machine 1, referring to FIG. 4 FIG. 4 is a flow chart of a speakerphone mode control program.

In step (referred to as merely "S" hereinafter) 1, at first, it is judges whether or not the speakerphone key 14 has been depressed. When the key 14 is not depressed (S1: NO), the control part 17 waits for a depression of the key 14. When the speakerphone key 14 is depressed (S1: YES), the control part 17 judges in S2 whether or not a call signal from some other telephone is arriving to the facsimile machine 1, in other words, whether a calling bell is ringing in response to a call signal from some other telephone of the other end of the line.

When a call signal is being transmitted from some other telephone (S2: YES), the program is advanced to S7 to enable to make a call. On the other hand, when the facsimile machine 1 is receiving no call signal from some other telephone (S2: NO), that is, when the facsimile machine 1 is giving a call signal to any other telephone, the speaker 26 is made ON and the microphone M is made OFF at the same time, and a dial tone is generated in S3. Although the dial tone is generated by the speaker 26, the microphone M being OFF at that time, the dial tone is not received by the microphone M and thus does not come out from the speaker 26. This can prevent the occurrence of howling phenomenon caused by the dial tone received by the microphone M and sounded from the speaker 26.

In S4, it is judged whether the dial key has been depressed. The judgement is made by detecting whether any one key of the dial key group 11 has been depressed. This is based on that a dial tone will be not generated as soon as at least one of the dial key group 11 is depressed. When any of the dial key group 11 is not depressed (S4: NO), the control part 17 waits for depression of the dial key 11. When the dial key 11 is depressed (S4: YES), alternatively, the program advances to S5. In S5, it is judged whether the telephone line 25 is connected to a telephone of the other end. When the telephone line 25 is connected to the other telephone (S5: YES), the speaker 26 is maintained as being ON and the microphone M is made ON, which enables a user to make a call with the other telephone in the speakerphone mode without taking up the handset 10. When the telephone line 25 is not connected with a telephone of the other end (S5: NO), the control part 17 waits for the connection of the telephone line 25. Accordingly, it is possible to prevent a ring back tone produced until the line 25 is connected from being received by the microphone M and sounded from the speaker 26, thus howling phenomenon from being generated.

On the other hand, when a call signal from a telephone of the other end is arriving to the facsimile machine 1 (S2: YES), the program advances to S7. In S7, the telephone line 25 is connected to the telephone of the other end to enable a call thereto. After that, the microphone M is made ON while the speaker 26 is maintained as being ON in S6. This makes it possible to make a call with the telephone of the other end in the speakerphone mode without taking up the handset 10.

As mentioned in detail above, the facsimile machine 1 in the present embodiment is so constructed that the speaker 26 is made ON and the microphone M is made OFF (S3) when the speakerphone key 14 is depressed (S1: YES) and no call signal from some other telephone is arriving to the facsimile machine 1. Accordingly, when a call is made in the speakerphone mode executed by the depression of the speakerphone key 14, the microphone M being OFF, a dial tone is not received by the microphone M, preventing the occurrence of howling phenomenon caused when the dial tone is received by the microphone M and sounded through the speaker 26.

The facsimile machine 1 is also constructed so that the microphone M is made ON while the speaker 26 is maintained as being ON (S6) when any one key of the dial key group 11 is depressed (S4: YES) and the telephone line 25 is connected to some other telephone (S5: YES). This makes it possible to make a normal call in the speakerphone mode. At this time, the microphone M being made ON upon depression of at least one of the dial key group 11, the facsimile machine 1 can quickly be switched to the speakerphone mode without causing any inconvenience in a call.

Considering that, even when the speakerphone key 14 is depressed, a dial tone is not produced while a call signal from some other telephone is arriving to the facsimile machine 1 (S2: YES), the telephone line 25 is connected to a telephone of the other end (S7), making both the speaker 26 and the microphone M ON (S6), and as a result thereof a call in the speakerphone mode can be made.

The present invention may be embodied in other specific forms without departing from the spirit or essential characteristics thereof. For instance, although the facsimile machine 1 in the above embodiment is constructed so that both the speaker 26 and the microphone M are made ON upon depression of at least one key of the dial key group 11 to make a call in the speakerphone mode, the present invention is not limited thereto. In general, a telephone having an extension telephone function is switched to a mode capable of making a call outside upon depression of the key "0" of the dial key group 11. Then, the telephone can make a call outside upon depression of any dial keys 11 following the key "0". In this case, the telephone device may be constructed so that both the speaker 26 and the microphone M are made ON as soon as the second key of the dial key group 11 is depressed.

For the cases where making the microphone M OFF can prevent the occurrence of howling phenomenon, the following cases may be raised. For example, it is conceivable that the control part 17 causes the microphone M to become OFF when detecting that the line is disconnected by the telephone of the other end after starting a call with the microphone M being made ON, so that it is possible to prevent the occurrence of howling which may be caused by a busy tone generated upon the disconnection of the line, received by the microphone M and sounded through the speaker 26.

It is also conceivable that the control part 17 causes the microphone M to become OFF when detecting a continuous monotonous sound even in making a call, and a side microphone M to become ON when detecting the monotonous sound is stopped, so that howling caused by the monotonous sound received by the microphone M and sounded through the speaker 26 can be prevented from occurring.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated.

It is intended that the scope of the invention be defined by the claims appended hereto, and their equivalents.

What is claimed is:

1. A telephone device comprising:

a microphone and a speaker provided in a body unit;

a mode selection key for selecting a speakerphone mode enabling a call through the microphone and speaker;

a control panel in which a plurality of dial keys are arranged;

first judgement means for judging whether the mode selection key has been operated;

first control means for making the speaker ON and the microphone OFF when the first judgement means detects that the mode selection key has been operated; and second control means for maintaining the speaker in the ON state and making the microphone ON upon operation of the dial key.

2. A telephone device according to claim 1, wherein the first control means controls the speaker to produce a dial tone after making the microphone OFF.

3. A telephone device according to claim 1, wherein the second control means makes the microphone ON when at least one dial key is operated.

4. A telephone device according to claim 1, further comprising second judgement means for judging whether or not a call signal from some other telephone is arriving to the telephone device after the first judgement means detects that the mode selection key has been operated, wherein the first control means makes the speaker ON and the microphone OFF when the second judgement means judges that no call signal is arriving from some other telephone.

5. A telephone device according to claim 1, further comprising a facsimile function.

6. The telephone device according to claim 1, wherein the second control means turns the microphone ON after pressing the dial key which serves as a trigger.

7. A telephone device comprising:

a microphone and a speaker provided in a body unit;

a mode selection key for selecting a speakerphone mode enabling a call through the microphone and the speaker;

a control panel in which a plurality of dial keys are arranged;

first judgement means for judging whether the mode selection key has been operated;

first control means for making the speaker ON and the microphone OFF when the first judgement means detects that the mode selection key has been operated;

second judgement means for judging whether or not a call signal from some other telephone is arriving to the telephone device after the first judgement means detects that the mode selection key has been operated, connecting means for connecting a line of the telephone device with some other telephone when the second judgement means judges that there is a call from some other telephone; and second control means for making the speaker and the microphone ON after the line-connection by the connecting means.

8. A telephone device, comprising:

a microphone and a speaker provided in a body unit;

a mode selection key for selecting a speakerphone mode enabling a call through the microphone and the speaker;

a control panel, on which a plurality of dial keys are arranged;

first judgement means for judging whether the mode selection key has been operated;

first control means for turning the speaker ON to allow a dial tone to come out of the speaker and the microphone OFF when the first judgement means judges that the mode selection key has been operated; and second control means for maintaining the speaker in the ON state and turning the microphone ON after operation of the dial key to prevent the microphone from receiving the dial tone coming out of the speaker, thereby preventing occurrence of howling.

9. A telephone device, comprising:

a microphone and a speaker provided in a body unit;

a mode selection key for selecting a speakerphone mode enabling a call through the microphone and the speaker;

a control panel on which a plurality of dial keys are arranged;

first judgement means for judging whether the mode selection key has been operated;

second judgement means for determining, after the first judgement means determines that the mode selection means has been operated, whether a call signal from another telephone device is arriving at the present telephone device;

first control means for turning the speaker ON to allow a dial tone to come out of the speaker and the microphone OFF when the second judgement means determines that no call from another telephone device is arriving; and second control means for maintaining the speaker in the ON state to allow a ring back tone transmitted from an exchange to come out of the speaker and turning the microphone OFF after input of a telephone number of another telephone device by operation of the dial keys on the control panel.

10. The telephone device according to claim 9, further comprising:

third judgement means for determining whether a telephone line has been connected with the other telephone device; and third control means for maintaining the speaker in the ON state to allow voice transmitted from an exchange of the other telephone device to come out of the speaker and turning the microphone ON after the third judgement means determines that the telephone line has been connected with the other telephone device.

11. A telephone device which enables a telephone conversation in a speakerphone with a microphone and a speaker provided in a body unit, the device comprising:

judgement means for determining whether a telephone line with a telephone device at a remote location has been disconnected during a telephone conversation using the speakerphone with the remote telephone device; and control means for turning the microphone OFF to prevent the microphone from receiving a busy tone coming out of the speaker, thereby preventing occurrence of howling, after the judgement means determines that the telephone line with the remote telephone device has been disconnected.

12. A telephone device which enables a telephone conversation in a speakerphone with a microphone and a speaker provided in a body unit, the device comprising:

first detection means for detecting continuous generation of a single tone during a telephone conversation using the speakerphone with a telephone device at a remote location; and control means for turning the microphone OFF to prevent the microphone from receiving the single tone coming out of the speaker, thereby preventing occurrence of howling, after the first detection means detects that the single tone is continuously generated.

13. The telephone device according to claim 12, further comprising second detection means for detecting stop of the generation of the single tone after the first detection means detects the continuous generation of the single tone, wherein the control means turns the microphone ON after the second detection means detects that the generation of the single tone is stopped.

14. A telephone device which enables a bidirectional telephone communication by voice with another telephone device, the device comprising:

a microphone and a speaker provided in a body unit;

a mode selection key for selecting a speakerphone mode enabling a call through the microphone and the speaker;

first judgement means for judging whether the mode selection key has been operated;

first control means for turning the speaker ON and the microphone OFF when the first judgement means judges that the mode selection key has been operated;

second judgement means for judging whether a telephone line has been connected with another telephone device; and second control means for maintaining the speaker in the ON state and turning the microphone from OFF to ON after the second judgement means judges that the telephone line has been connected with the other telephone device.

15. A telephone device which enables a bidirectional telephone communication by voice with another telephone device, the device comprising:

a microphone and a speaker provided in a body unit;

a mode selection key for selecting a speakerphone mode enabling a call through the microphone and the speaker;

first judgement means for judging whether the mode selection key has been operated;

second judgement means for detecting a presence or absence of a call from another telephone device; and control means for turning the speaker ON and the microphone OFF until connection with another telephone device is established after the first judgement means judges that the mode selection key has been operated and the second judgement means detects the absence of a call from the another telephone device.

16. The telephone device according to claim 15, wherein the control means turns the microphone ON when the connection with another telephone device is established.

* * * * *